(12) United States Patent
Burmeister et al.

(10) Patent No.: US 6,462,123 B1
(45) Date of Patent: Oct. 8, 2002

(54) CONDUCTIVE LINOLEUM FLOOR COVERING

(75) Inventors: Guido Burmeister, Wildeshausen; Karen Brumm, Delmenhorst, both of (DE)

(73) Assignee: DLW Aktiengesellschaft (DE)

( * ) Notice: Subject to any disclaimer, the term of this patent is extended or adjusted under 35 U.S.C. 154(b) by 0 days.

(21) Appl. No.: 09/486,326

(22) PCT Filed: Aug. 18, 1998

(86) PCT No.: PCT/EP98/05246

§ 371 (c)(1),
(2), (4) Date: May 8, 2000

(87) PCT Pub. No.: WO99/10592

PCT Pub. Date: Mar. 4, 1999

(30) Foreign Application Priority Data

Aug. 27, 1997  (DE) ......................... 197 37 397

(51) Int. Cl.⁷ ................................................. C08K 3/34
(52) U.S. Cl. ....................................................... 524/448
(58) Field of Search ......................................... 524/448

(56) References Cited

FOREIGN PATENT DOCUMENTS

| EP | 0 174 042 | 3/1986 | ............. C09F/7/00 |
| GB | 2 159 184 A | 11/1985 | ............. D06N/1/00 |

OTHER PUBLICATIONS

Database WPI, Section Ch, Week 7517, Derwent Publications Ltd., London, GB; Class A84, AN 75–28560W, XP002089299 & SU 432 253A (New Bldg. Materials Res), Nov. 14, 1974 sieh Zusammenfassung.

Primary Examiner—Paul R. Michl
(74) Attorney, Agent, or Firm—Womble Carlyle Sandridge & Rice, PLLC

(57) ABSTRACT

Electrically conductive linoleum-based floor covering with a content of an additive enhancing the conductive and antistatic properties of the floor covering, whereby the floor covering comprises as an additive at least one cationic compound with a quaternary nitrogen atom, particularly a derivative of imidazole, imidazoline or morpholine, whereby the covering also contains silica, particularly kieselguhr, in addition to the common processing aids and additives.

44 Claims, No Drawings

CONDUCTIVE LINOLEUM FLOOR COVERING

This is a 371 of PCT/EP98/05246 filed Aug. 18, 1998.

FIELD OF THE INVENTION

The invention relates to an electrically conductive linoleum-based floor covering (hereinafter also referred to as linoleum floor covering). By adding at least one derivative of imidazole, imidazoline, benzimidazole or morpholine, particularly at least one cationic compound with a quaternary nitrogen atom of at least one derivative of imidazole, imidazoline or benzimidazole, the linoleum floor covering is made electrically conductive or anti-static.

BACKGROUND OF THE INVENTION

The production of linoleum has been known for a long time and is carried out by first mixing all components such as linoleum cement, at least one filler and at least one coloring agent in a mixing unit, e.g., a kneader, rolling mill or extruder, to form a matrix that is as homogenous as possible. Typical fillers are wood flour, ground cork, chalk, kaolin, heavy spar and the like. The mixed mass usually contains at least one coloring agent such as a pigment, e.g., titanium dioxide, iron oxide, zinc oxide or other common coloring agents based on inorganic and organic dyes. A typical linoleum composition contains, based on the weight of the wear layer, approximately 40% by weight binder, approximately 30% by weight organic fillers, approximately 20% by weight inorganic mineral fillers and approximately 10% by weight coloring agents. The mixed mass can furthermore contain common additives such as processing agents, antioxidants, UV stabilizers, slip additives and radical initiators or also siccatives that are selected dependent on the binder.

To produce a one-colored linoleum covering, the mixed mass thus obtained is supplied to a rolling mill and, under pressure, at a temperature of typically 10° to 150° C. (depending on the formula and the process technology) is pressed onto a backing material. The backing material may be a material based on natural and/or synthetic fabrics or knits as well as textile materials. For example, jute fabrics, mixed fabrics of natural fibers, such as cotton, viscose staple fiber and the like, can be used.

When the mixed mass is pressed onto the backing material, the rolling mill is adjusted to produce 2 to 6 mm, particularly 2 to 4 mm, thick webs of floor covering.

The mixed mass, as described above, may be pressed directly onto the backing, which produces single-layer floor coverings. However, the mixed mass may also be supplied to a rolling mill without simultaneously feeding a backing fabric. The backing-free linoleum strip, which is referred to as sheet, can then be pressed onto a single-layer linoleum covering by a calender or by presses. These are then referred to as multi-layer (here: two-layer) coverings. The formulation composition of the two layers is substantially identical, only the pigment composition can vary.

If a color-patterned floor covering is to be produced, differently colored, granulated mixed masses or matrices are mixed and subsequently supplied to a rolling mill and then pressed.

Since the linoleum floor covering sheets thus obtained still do not have adequate tensile strength and compressive strength, they are dried in a subsequent maturing process in maturing chambers at a temperature of about 40° to 100° C., typically 60° to 80° C., for a period of a few days up to several weeks. This causes the binder further to cross-link and gives the material the desired tensile and compressive strength.

For further details on linoleum production, reference is made to Ullmann, Enzyklopädie der technischen Chemie [Encyclopedia of Industrial Chemistry], $4^{th}$ Edition, Volume 12, pp. 24 and 25.

A disadvantage of prior art linoleum is that due to its relatively high leakage values (RA>$10^{11}$ Ohm) it cannot be used in rooms the functional principles of which require that the floor covering must have certain electrical leakage values, e.g., operating rooms and computer rooms. For this type of application, it is known that the electrical leakage resistance of the linoleum floor covering can be reduced by adding electrically conductive fillers, e.g. special carbon blacks and metal powders. This has the drawback, however, that the wear properties are impaired by the corresponding additive. Color design options are also greatly reduced.

DE 34 16 573 C2 (DLW AG) therefore describes conductive, antistatic linoleum sheets that have been made electrically conductive by adding derivatives of imidazoline, imidazole or morpholine. These additives are added to the linoleum formulation in amounts of up to 15% by weight. The conductivity agent added in accordance with DE 34 16 573 C2 can be added to the linoleum mass in liquid form or as a liquid preparation. Viscous agents are partly absorbed by the filler used, such as wood flour or aluminum hydroxide and titanium dioxide. Nevertheless, the mixed mass has a different Theological quality than a regular mixed linoleum mass without any addition of conductivity agent. In other words, the mass thus obtained smears more than a normal "drier" mass. Due to this "smearing" the desired patterns are difficult to achieve. For this reason, 2.0 mm thick linoleum sheet products have thus far not been offered, only 2.5 mm or thicker.

A further problem arises since acceptable maturing times should be achieved despite this addition of liquid conductivity agent to the mixed mass. For this purpose, radical initiators, inter alia, can be used as maturing promoters. Due to the particular nature of some of these radical initiators, however, thermal stress can cause a strong odor on the machines as well as in the finished linoleum, which is undesirable for well-known reasons.

Thus, it is the object of the present invention to provide a suitable linoleum sheet as a floor covering that has low electrical leakage resistance RA (<$10^8$ Ohm) but avoids the aforementioned defects of the state of the art and achieves acceptable maturing times for the linoleum floor covering sheets without the addition of radical initiators.

SUMMARY OF THE INVENTION

This object is attained by the subject characterized in claim 1.

Advantageous embodiments of the invention are set forth in the subclaims.

DETAILED DESCRIPTION OF THE INVENTION

In the context of the present invention, it has been shown that by adding kieselguhr to the linoleum mass, the mixed mass becomes less smeary and the rheological properties can therefore be clearly improved. By adding kieselguhr, the maturing time of the sheet product was reduced and the maturing process in the maturing chambers was achieved in a period of approximately 1 month/4 weeks. On average, the maturing time is reduced by approximately 1 week compared to the state of the art; in individual cases, however, the absolute maturing time was up to 7 weeks and was reduced to 4 weeks by adding kieselguhr.

The addition of kieselguhr makes it possible to eliminate the addition of radical initiators since the added kieselguhr already sufficiently reduces the maturing time. Eliminating the radical initiators thus also eliminates the odor nuisance during the production of the linoleum sheet, particularly when the mixture is heated prior to processing, as well as at the customer's location.

Thus, the invention relates to a linoleum-base electrically conductive floor covering with a content of an additive enhancing the conductive and antistatic properties of the covering. The covering contains as an additive at least one derivative of imidazole, imidazoline or morpholine, preferably a cationic compound with a quaternary nitrogen atom. Such derivatives are known per se as antistatic agents (cf. DE 34 16 573 C2).

Examples for compounds that may be used in accordance with the invention are:

1. Imidazole derivatives of the formula:

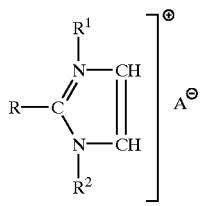

where:

R is an aliphatic group, particularly an alkyl group with 6 to 30 C atoms;

$R^1$ and $R^2$ are hydrogen atoms, alkyl or hydroxy alkyl groups, particularly alkyl or hydroxy alkyl groups with 1–5 C atoms and $A^-$ is an anion, typical for cationic surface-active compounds.

Typically, R can represent, for example, an alkyl group with 12–18 C atoms, $R^1$ and $R^2$ are methyl or ethyl groups and $A^-$ represents a group of the formula $-OSO_3R^3$, where $R^3$ is an alkyl group with preferably 1–5 C atoms, or represents a halogen atom.

2. Benzimidazole derivatives of the formula:

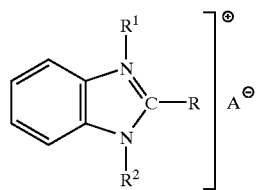

where R, $R^1$, $R^2$ and $A^-$ have the meaning indicated above. Typically, R represents a group of the formula $-C_{17}H_{35}$, $R^1$ and $R^2$ are methyl groups and $A^-$ represents an anion of the formula $-OSO_3CH_3$.

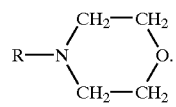

4. Quaternary morpholine derivatives of the formula:

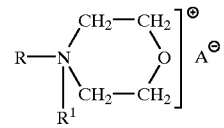

where R, $R^1$ and $A^-$ have the aforementioned meaning.

5. Imidazoline derivatives of the formula:

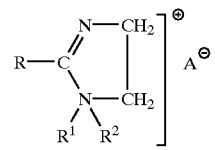

where R, $R^1$, $R^2$ and $A^-$ have the aforementioned meaning. Typically, R represents, for example, an alkyl group with 12–18 C atoms, $R^1$ is a methyl group, $R^2$ is a group of the formula $-C_2H_4OH$, and $A^-$ represents a chloride ion.

The required amount of the compound or compound mixtures used in accordance with the invention depends on the formulation of the corresponding linoleum quality and on the moment when it is added.

The inventive antistatic agent is preferably incorporated at the earliest possible moment to obtain a homogenous distribution of the antistatic agent. The amount of the antistatic agent to be added in this case is preferably between 0.5% and 15% by weight in relation to the total formulation.

In the context of the present invention, it has been shown that a linoleum floor covering with the desired electric conductivity (leakage resistance RA of $<10^8$ Ohm) can be obtained as follows:

The mixed mass of the components required for the linoleum floor coverings is produced in the same way as before. In addition, 0.5% to 30% by weight, preferably 3% to 5% by weight, kieselguhr is added to the linoleum mass together with the other dry fillers. The added conductivity agent (derivative of imidazole, imidazoline or morpholine) is absorbed by the fillers during the mixing process, particularly by the[1] kieselguhr, so that the mixed mass is less smeary. The addition of radical initiator was dispensed with entirely. The floor covering had an electrical leakage resistance RA of $<10^8$ Ohm. The maturing time of the linoleum sheet was reduced by approximately 1 week. According to the invention, sheet product with a thickness of 2.0 mm and a standardized patterning can be achieved.

[1] Translator's note: this change merely relates to the gender of the noun kieselguhr.

The floor covering according to the invention consists of at least one single-layer sheet that is applied to a backing material, e.g., jute. The floor covering, however, can also consist of two-layer or multi-layer sheets that are applied to the backing material.

In a special embodiment of the invention, the linoleum sheet includes an underlay of corkment.

In another embodiment of the invention, in so-called cork linoleum, cork granulate is used as filler.

The sorption agent used according to the invention is kieselguhr (frequently also referred to as silica). The $SiO_2$ content is at least 70%, preferably 71–93%. The kieselguhr used is natural kieselguhr (fresh or salt water) and may comprise both calcined types and types that are simply dried. With respect to the absorption properties, kieselguhr's oil absorption is at least 100% by weight, preferably 125% to 230% by weight and its water absorption at least 125% by weight, preferably between 150% to 280% by weight.

In a particularly preferred embodiment of the invention, a kieselguhr type consisting of natural saltwater diatomaceous earth with a $SiO2$ content of 74% and a BET surface of 50.7 $m^2/g$ is used. The oil absorption of this specific kieselguhr type is 125% by weight, water absorption is 150% by weight.

Since kieselguhr is a natural product, fluctuations are relatively large depending on the locality where it is found as well as the degree and type of processing.

Below, the invention is further explained by means of the following examples.

EXAMPLE 1

A conductive, one-colored, mixed linoleum mass is produced by first mixing all dry ingredients in a powder mixer until homogenous.

This premix comprises organic fillers, such as wood flour and ground cork, in an amount of 31% by weight in relation to the total mixed mass. The inorganic fillers used are pigments, primarily titanium dioxide, in an amount of 13% by weight in relation to the weight of the mixed mass, as well as other fillers, such as aluminum hydroxide, at 12% by weight in relation to the weight of the mixed mass. According to the invention, 3% by weight of kieselguhr ($SiO_2$ content 74%, BET surface 50.7 $m^2/g$) in relation to the total mixed mass was also added to this premix (it is important that the kieselguhr is introduced before the liquid conductivity agent is added). This premix, together with the liquid conductivity agent (6% by weight) and the linoleum cement (35% by weight) in relation to the mixed mass) is kneaded. This mixed mass was rolled by a rolling mill into a linoleum sheet and subsequently pressed by a calender onto a backing material, in this case a single-layer linoleum sheet of jute. The sheet was then conventionally matured/dried in a maturing chamber for a period of approximately 4 weeks to obtain the finished floor covering.

The floor covering has an electrical leakage current of RA $3.2 \times 10^7$ Ohm, measured in accordance with DIN 51935.

The floor covering produced according to the invention had the desired marbled structure, which still remained visible. The thickness of the product was 2 mm.

EXAMPLE 2

A linoleum sheet was produced from:

(a) (Exemplary formulation for corkment)
    36% by weight cement
    10% by weight wood flour
    10% by weight ground scrap (finely ground, matured linoleum)
    30% by weight ground cork
    8% by weight conductivity agent
    4.5% by weight kieselguhr
    1.5% by weight pigments
    Leakage resistance: $5 \times 10^6$ Ohm
    Maturing period: 10 days
    Thickness: 3.5 mm or (b) 30% by weight cement
    5% by weight wood flour
    25% by weight ground scrap
    30% by weight ground cork
    6% by weight conductivity agent
    3% by weight kieselguhr
    1% by weight pigments
    Conductivity: $2 \times 10^7$ Ohm
    Maturing period: 7 days
    Thickness: 3.2 mm

EXAMPLE 3

A linoleum sheet was produced from:

(Exemplary formulation for cork linoleum)
    34% by weight cement
    11% by weight wood flour
    12% by weight ground cork
    17% by weight aluminum hydroxide
    15% by weight pigments (primarily titanium dioxide)
    2% by weight other pigments
    3% by weight kieselguhr
    8% by weight conductivity agent
    Leakage resistance: $3 \times 10^7$ Ohm
    Maturing period: 28 days
    Thickness: 3.2 mm

[handwritten]

Annex A to the International Preliminary Examination

| Sample Formulation: | + Kieselguhr 3151-30 8180 | 3151-30 6620 | + Kieselguhr 3121-55 1590 | + Kieselguhr 3121-55 1600 | 3121-55 7820 |
|---|---|---|---|---|---|
| Wood flour | 15.6 | 15.8 | 26.8 | 27.1 | 23.4 |
| Cement | 30.1 | 30.3 | 34.6 | 34.9 | 33.8 |
| Ground cork | 4.2 | 4.2 | 0.6 | 0.8 | 0.6 |
| Ground scrap | 23.2 | 23.7 | 7.8 | 7.4 | 12.0 |
| Aluminum hydroxide | 12.0 | 14.3 | 11.4 | 11.4 | 14.5 |
| Titanium dioxide | 4.6 | 4.6 | 8.9 | 8.5 | 9.0 |
| Other pigments | 1.3 | 1.2 | 1.0 | 1.0 | 0.8 |
| Radical initiators | 0.0 | 0.2 | 0.0 | 0.0 | 0.2 |
| Antistatic agent | 6.0 | 5.7 | 6.0 | 6.0 | 5.7 |
| Kieselguhr | 3.0 | 0.0 | 2.9 | 2.9 | 0.0 |

-continued

| Thickness [mm]: | 4.0 | 4.0 | 3.2 | 2.5 | 3.2 |
|---|---|---|---|---|---|
| Maturing time [d]: | 11 | 30 | 25 | 25 | >39 |
| Conductivity [Ω]: | $8.0 \times 10^7$ | $7.8 \times 10^7$ | $3.8 \times 10^7$ | $3.2 \times 10^7$ | $2.8 \times 10^7$ |

| Sample Formulation: | + Kieselguhr 3121-36 9160 | 3121-55 2910 | + Kieselguhr 3121-55 1040 | + Kieselguhr 3121-55 9230 | 3121-55 7830 |
|---|---|---|---|---|---|
| Wood flour | 30.7 | 22.7 | 27.0 | 27.0 | 23.4 |
| Cement | 34.1 | 33.6 | 34.0 | 34.0 | 33.8 |
| Ground cork | 0.0 | 0.8 | 0.3 | 0.3 | 0.6 |
| Ground scrap | 5.2 | 12.3 | 9.1 | 9.1 | 12.0 |
| Aluminum hydroxide | 12.0 | 15.5 | 10.4 | 10.4 | 14.5 |
| Titanium dioxide | 8.1 | 8.3 | 10.1 | 10.1 | 9.0 |
| Other pigments | 0.9 | 0.8 | 0.3 | 0.3 | 0.8 |
| Radical initiators | 0.0 | 0.2 | 0.0 | 0.0 | 0.2 |
| Antistatic agent | 6.0 | 5.8 | 5.9 | 5.9 | 5.7 |
| Kieselguhr | 3.0 | 0.0 | 2.9 | 2.9 | 0.0 |
| Thickness [mm]: | 3.2 | 3.2 | 2.5 | 2.0 | 2.5 |
| Maturing time [d]: | 24 | 34 | 26 | 26 | 39 |
| Conductivity (Ω): | $<1 \times 10^6$ | $2.3 \times 10^7$ | $1.0 \times 10^6$ | $1.5 \times 10^7$ | $3.2 \times 10^7$ |

| Formulation: | 209-4 | + Kieselguhr 209-Std | Corkment + Kieselguhr 9050/9090* | Corkment 1980 |
|---|---|---|---|---|
| Wood flour | 29.0 | 29.0 | 0.0 | 0.0 |
| Cement | 34.0 | 34.0 | 37.4 | 34.1 |
| Ground cork | 0.0 | 0.0 | 37.4 | 35.6 |
| Ground scrap | 0.0 | 0.0 | 11.7 | 29.8 |
| Aluminum hydroxide | 17.0 | 14.0 | 0.0 | 0.0 |
| Titanium dioxide | 13.2 | 13.2 | 0.0 | 0.0 |
| Other pigments | 0.0 | 0.0 | 0.8 | 0.5 |
| Radical initiators | 0.2 | 0.0 | 0.0 | 0.0 |
| Antistatic agent | 6.1 | 6.1 | 8.2 | 0.0 |
| Kieselguhr | 0.0 | 3.0 | 4.7 | 0.0 |
| Thickness [mm]: | 3.19 | 3.12 | 2.0 | 2.0 |
| Maturing time [d]: | 36 | 27 | 4/6* | 7 |
| Conductivity [Ω]: | $2.5 \times 10^7$ | $3.5 \times 10^7$ | $6.0 \times 10^6$ $1.8 \times 10^{7*}$ | $>1 \times 10^{11}$ |

*2 weeks of intermediate storage

What is claimed is:

1. An electrically conductive linoleum-based floor covering comprising:
   an additive for enhancing the conductive and antistatic properties of the floor covering comprising at least one cationic compound having a quaternary nitrogen atom comprising an imidazole derivative having the formula of:

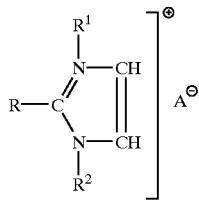

where:
   R is an aliphatic group, including an alkyl group with 6 to 30 C atoms;
   R' and $R^2$ are selected from the group consisting of hydrogen atoms, alkyl and hydroxyl alkyl groups;
   $A^-$ is an anion; and
   a kieselguhr, whereby the additive and the kieselguhr constitute a mixed linoleum mass.

2. The floor covering as claimed in claim 1, wherein the kieselguhr is present in an amount of 0.5% to 30% by weight in relation to the weight of the mixed linoleum mass.

3. The floor covering as claimed in claim 1, wherein the kieselguhr is present in an amount of 3% to 5% by weight in relation to the weight of the mixed linoleum mass.

4. The floor covering as claimed in claim 1, wherein the kieselguhr has a $SiO_2$ content of at least 70%, an oil absorption of at least 100% by weight and a water absorption of at least 125% by weight.

5. The floor covering as claimed in claim 1, wherein the floor covering has an electrical leakage resistance RA of $<10^8$ ohm.

6. The floor covering as claimed in claim 1, wherein the additive is present in an amount of 0.5% to 15% by weight in relation to the weight of the mixed linoleum mass.

7. The floor covering as claimed in claim 1, wherein the floor covering comprises at least one single-layer sheet.

8. The floor covering as claimed in claim 1, further comprising:
   a backing material underlying the mixed linoleum mass.

9. The floor covering as claimed in claim 1, wherein the mixed linoleum mass is free of radical initiators.

10. The floor covering as claimed in claim 1, further comprising:
    an underlay of corkment.

11. The floor covering as claimed in claim 1, further comprising:
    a cork granulate filler.

12. An electrically conductive linoleum-based floor covering comprising:

an additive for enhancing the conductive and antistatic properties of the floor covering comprising at least one cationic compound having a quaternary nitrogen atom comprises a benzimidazole derivative having the formula of:

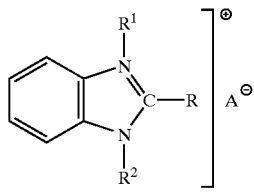

where:
R is an aliphatic group, including an alkyl group with 6 to 30 C atoms;
R' and $R^2$ are selected from the group consisting of hydrogen atoms, alkyl and hydroxyl alkyl groups;
$A^-$ is an anion; and
a kieselguhr, whereby the additive and the kieselguhr constitute a mixed linoleum mass.

13. The floor covering as claimed in claim 12, wherein the kieselguhr is present in an amount of 0.5% to 30% by weight in relation to the weight of the mixed linoleum mass.

14. The floor covering as claimed in claim 12, wherein the kieselguhr is present in an amount of 3% to 5% by weight in relation to the weight of the mixed linoleum mass.

15. The floor covering as claimed in claim 12, wherein the kieselguhr has a $SiO_2$ content of at least 70%, an oil absorption of at least 100% by weight and a water absorption of at least 125% by weight.

16. The floor covering as claimed in claim 12, wherein. the floor covering has an electrical leakage resistance RA of $<10^8$ ohm.

17. The floor covering as claimed in claim 12, wherein the additive is present in an amount of 0.5% to 15% by weight in relation to the weight of the mixed linoleum mass.

18. The floor covering as claimed in claim 12, wherein the floor covering comprises at least one single-layer sheet.

19. The floor covering as claimed in claim 12, further comprising:
a backing material underlying the mixed linoleum mass.

20. The floor covering as claimed in claim 12, wherein the mixed linoleum mass is free of radical initiators.

21. The floor covering as claimed in claim 12, further comprising:
an underlay of corkment.

22. The floor covering as claimed in claim 12, further comprising:
a cork granulate filler.

23. An electrically conductive linoleum-based floor covering comprising:
an additive for enhancing the conductive and antistatic properties of the floor covering comprising at least one cationic compound having a quaternary nitrogen atom comprises a quaternary morpholine derivative having the formula of:

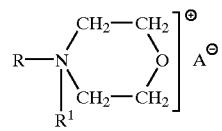

where:
R is an aliphatic group, including an alkyl group with 6 to 30 C atoms;
R' and $R^2$ are selected from the group consisting of hydrogen atoms, alkyl and hydroxyl alkyl groups;
$A^-$ is an anion; and
a kieselguhr, whereby the additive and the kieselguhr constitute a mixed linoleum mass.

24. The floor covering as claimed in claim 23, wherein the kieselguhr is present in an amount of 0.5% to 30% by weight in relation to the weight of the mixed linoleum mass.

25. The floor covering as claimed in claim 23, wherein the kieselguhr is present in an amount of 3% to 5% by weight in relation to the weight of the mixed linoleum mass.

26. The floor covering as claimed in claim 23, wherein the kieselguhr has a $SiO_2$ content of at least 70%, an oil absorption of at least 100% by weight and a water absorption of at least 125% by weight.

27. The floor covering as claimed in claim 23, wherein the floor covering has an electrical leakage resistance RA of $<10^8$ ohm.

28. The floor covering as claimed in claim 23, wherein the additive is present in an amount of 0.5% to 15% by weight in relation to the weight of the mixed linoleum mass.

29. The floor covering as claimed in claim 23, wherein the floor covering comprises at least one single-layer sheet.

30. The floor covering as claimed in claim 23, further comprising:
a backing material underlying the mixed linoleum mass.

31. The floor covering as claimed in claim 23, wherein the mixed linoleum mass is free of radical initiators.

32. The floor covering as claimed in claim 23, further comprising:
an underlay of corkment.

33. The floor covering as claimed in claim 23, further comprising:
a cork granulate filler.

34. An electrically conductive linoleum-based floor covering comprising:
an additive for enhancing the conductive and antistatic properties of the floor covering comprising at least one cationic compound having a quaternary nitrogen atom comprises an imidazoline derivative having the formula of:

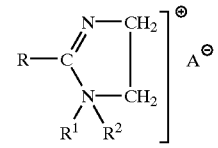

where:
R is an aliphatic group, including an alkyl group with 6 to 30 C atoms;
R' and $R^2$ are selected from the group consisting of hydrogen atoms, alkyl and hydroxyl alkyl groups;
$A^-$ is an anion; and
a kieselguhr, whereby the additive and the kieselguhr constitute a mixed linoleum mass.

35. The floor covering as claimed in claim 34, wherein the kieselguhr is present in an amount of 0.5% to 30% by weight in relation to the weight of the mixed linoleum mass.

36. The floor covering as claimed in claim 34, wherein the kieselguhr is present in an amount of 3% to 5% by weight in relation to the weight of the mixed linoleum mass.

37. The floor covering as claimed in claim 34, wherein the kieselguhr has a $SiO_2$ content of at least 70%, an oil absorption of at least 100% by weight and a water absorption of at least 125% by weight.

38. The floor covering as claimed in claim 34, wherein the floor covering has an electrical leakage resistance RA of $<10^8$ ohm.

39. The floor covering as claimed in claim 34, wherein the additive is present in an amount of 0.5% to 15% by weight in relation to the weight of the mixed linoleum mass.

40. The floor covering as claimed in claim 34, wherein the floor covering comprises at least one single-layer sheet.

41. The floor covering as claimed in claim 34, further comprising:

a backing material underlying the mixed linoleum mass.

42. The floor covering as claimed in claim 34, wherein the mixed linoleum mass is free of radical initiators.

43. The floor covering as claimed in claim 34, further comprising:

an underlay of corkment.

44. The floor covering as claimed in claim 34, further comprising:

a cork granulate filler.

* * * * *